United States Patent
Rudowicz et al.

(10) Patent No.: US 8,055,256 B2
(45) Date of Patent: Nov. 8, 2011

(54) METHOD AND APPARATUS FOR SELECTING SCANNING RATES IN A MULTI-MODE COMMUNICATION DEVICE

(75) Inventors: Michael J. Rudowicz, Boynton Beach, FL (US); Bradley J. Rainbolt, Sunrise, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 744 days.

(21) Appl. No.: 12/130,215

(22) Filed: May 30, 2008

(65) Prior Publication Data
US 2009/0296652 A1 Dec. 3, 2009

(51) Int. Cl.
*H04Q 7/00* (2006.01)
(52) U.S. Cl. ............... 455/426.1; 455/552.1; 455/456.1; 370/328; 370/252
(58) Field of Classification Search ............... 455/552.1, 455/509, 456.1; 370/328, 252
See application file for complete search history.

(56) References Cited

U.S. PATENT DOCUMENTS

| | | | |
|---|---|---|---|
| 7,218,933 B2 | 5/2007 | Mark et al. | |
| 2005/0096053 A1 | 5/2005 | Liu et al. | |
| 2006/0193295 A1 | 8/2006 | White et al. | |
| 2006/0282554 A1 | 12/2006 | Jiang et al. | |
| 2009/0280802 A1* | 11/2009 | Chin et al. | 455/426.1 |

FOREIGN PATENT DOCUMENTS

| | | |
|---|---|---|
| EP | 0812119 A2 | 12/1997 |
| EP | 1069794 B1 | 9/2006 |
| EP | 1843613 A1 | 10/2007 |
| WO | 2007023249 A1 | 3/2007 |

OTHER PUBLICATIONS

Enhanced User and Caller Notifications for a Multimodal Phone Being Used in a Mode Other Than One Over Which a Communication Attempt Is Made U.S. Appl. No. 11/614,822, filed Dec. 21, 2006—Birla et al.
Topics in Lightwave, Trends in Handover Design—Gregory P. Pollini—Bell Communications Research, Inc.—p. 82-90—1996.
A Seamless Handoff in IEEE 802.16a and IEEE 802.11n Hybrid Networks—Jing Nie, Jiangchuan Wen, Qi Dong, Zheng Zhou—Wireless Network Lab, Beijing University of Posts and Telecommunications, Beijing, China—pp. 383-387—2005.
Determining the Best Network to Handover Among Various IEEE 802.11 and IEEE 802.16 Networks by a Mobile Device—Abhinav Garg & Kin Choong Yow—School of Computer Engineering, Nanyang Technological University, Singapore—6 pages.
Patent Cooperation Treaty, "PCT Search Report and Written Opinion of the International Searching Authority" for International Application No. PCT/US2009/045390 Sep. 7, 2009, 17 pages.

* cited by examiner

*Primary Examiner* — Phuoc Doan

(57) ABSTRACT

A method and system for selecting scanning rates in a multi-mode communication device is disclosed herein. The method can include the step of—at a multi-mode communication device—measuring at least one parameter associated with an interaction between a first network and the multi-mode communication device. The method can further include the step of—in response to measuring the parameter—selecting a scanning rate of the multi-mode communication device for a second, different network that interacts with the multi-mode communication device. In the method, the first network and the second network can have independent synchronization procedures.

12 Claims, 2 Drawing Sheets

METHOD AND APPARATUS FOR
SELECTING SCANNING RATES IN A
MULTI-MODE COMMUNICATION DEVICE

BACKGROUND OF THE INVENTION

1. Field of the Invention

The claimed subject matter concerns scanning of wireless networks, and more particularly, methods for adaptively scanning multiple networks to facilitate vertical handover.

2. Description of the Related Art

As wireless technology continues to evolve, mobile devices will be able to support an increased number of applications, which may be offered by different service providers. In such an environment, multi-mode devices may be capable of simultaneously supporting multiple applications provided by different, independent networks with overlapping geographical coverage. The devices may also be capable of handing off a service between networks in a manner that appears to be seamless to users of the devices.

A challenge in the realization of this seamless mobility experience is maintaining acceptable battery life for the multi-mode devices, which can suffer when the devices scan for several networks simultaneously. The problem is exacerbated as the number of networks increases, particularly when the synchronization procedures of the networks operate independently. An efficient method of scanning for multiple networks simultaneously is needed.

SUMMARY OF THE INVENTION

A method for selecting scanning rates in a multi-mode communication device is disclosed herein. The method can include the steps of—at a multi-mode communication device—measuring at least one parameter associated with an interaction between a first network and the multi-mode communication device and in response to measuring the parameter, selecting a scanning rate of the multi-mode communication device for a second, different network that interacts with the multi-mode communication device. The first network and the second network can have independent synchronization procedures.

The parameter can include a coverage status of the first network at the multi-mode communication device, a signal strength at the multi-mode communication device, a quality of service support level of the first network at the multi-mode communication device, or a velocity of the multi-mode communication device. Moreover, selecting the scanning rate for the second network can comprise decreasing the scanning rate when the velocity is lower than a predetermined threshold, or increasing the scanning rate when the signal strength is lower than a predetermined threshold.

The method can further include the step of ranking each member of a set of networks based on measuring at least one parameter associated with an interaction between each network and the multi-mode communication device in which the set of networks can include the first network and the second network. The parameters on which the ranking of each member is based can include the quality of service support level of the network at the multi-mode communication device or the signal strength at the multi-mode communication device. In one embodiment, the first network can be a local area network, and the second network can be a wide area network.

Another method for selecting scanning rates in a multi-mode communication device is also disclosed herein. The method can include the steps of—at a multi-mode communication device—measuring at least one parameter associated with an interaction between a first network and the multi-mode communication device and measuring at least one parameter associated with an interaction between a second, different network and the multi-mode communication device. The method can further include the step of—in response to measuring the parameters—selecting a scanning rate of the multi-mode communication device for the second network. The first network and the second network can have independent synchronization procedures.

A multi-mode communication device is also disclosed herein. The multi-mode communication device can include a first transceiver that can interact with a first network having a first synchronization procedure. The multi-mode communication device can further include a second transceiver that can interact with a second, different network having a second synchronization procedure that can be independent of the synchronization procedure of the first network. Moreover, the multi-mode communication device can include a processor that is coupled to the first transceiver and coupled to the second transceiver. The processor can be operable to scan for the first network, scan for the second network, measure at least one parameter associated with the first network and in response to the measuring the parameter, select a scanning rate of the second network.

BRIEF DESCRIPTION OF THE DRAWINGS

Features that are believed to be novel are set forth with particularity in the appended claims. The claimed subject matter may best be understood by reference to the following description, taken in conjunction with the accompanying drawings, in the several figures of which like reference numerals identify like elements, and in which:

DETAILED DESCRIPTION

Figure 2:
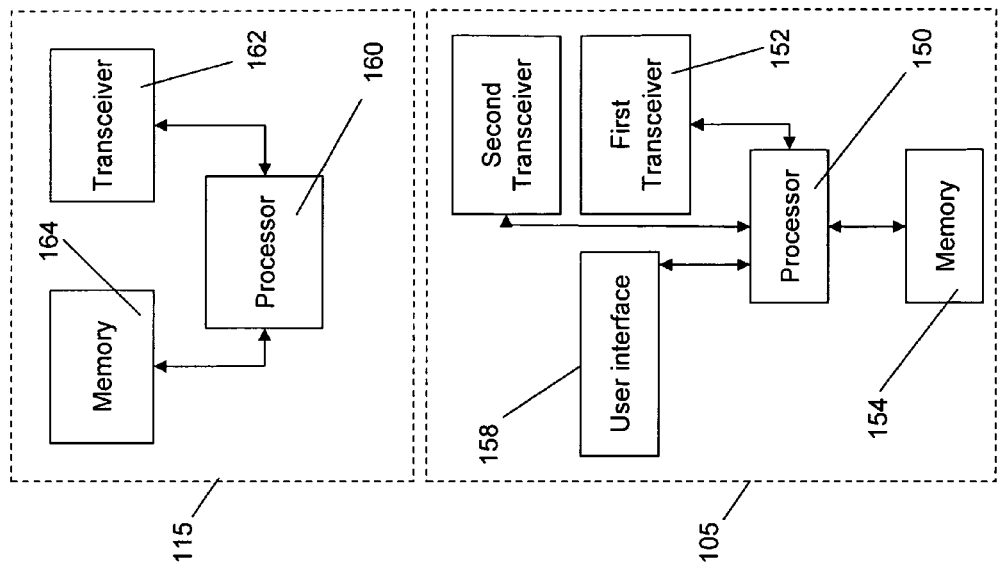
FIG. 2 shows an example of a block diagram of a base station of a communication network and a block diagram of a multi-mode communication device.

As required, detailed embodiments of the claimed subject matter are disclosed herein; however, it is to be understood that the disclosed embodiments are merely exemplary and can be embodied in various forms. Therefore, specific structural and functional details disclosed herein are not to be interpreted as limiting, but merely as a basis for the claims and as a representative basis for teaching one skilled in the art to variously employ the claimed subject matter in virtually any appropriately detailed structure. Further, the terms and phrases used herein are not intended to be limiting but rather to provide an understandable description.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled" as used herein, is defined as connected, although not necessarily directly, and not necessarily mechanically.

The term "transceiver" can be defined as any component or group of components that is capable of transmitting and/or receiving communications signals, including groups of components that are capable of at least simultaneously receiving communication signals from different sources that can support different protocols in which the source can be a network or a receiving unit. The term "processor" can mean any component or group of components, including any suitable combination of hardware and software, that is capable of carrying out any of the processes described herein.

The term "communication protocol" can refer to a set of pre-determined rules used by two units to exchange wireless signals. The term "synchronization" can refer to a process in which a communication device at least learns a timing reference used by another communication device. The terms "scan" or "monitor" can mean periodically checking one or more communication channels for one or more signals, which can include synchronization signals. A "handover" or a "vertical handover" can be a process in which a communication device receiving signals from a first network during a communication session subsequently receives signals from a second, different network during the same communication session.

A method and system for selecting scanning rates in a multi-mode communication device is disclosed herein. The method can include the steps of—at a multi-mode communication device—measuring at least one parameter associated with an interaction between a first network and the multi-mode communication device and in response to measuring the parameter, selecting a scanning rate of the multi-mode communication device for a second, different network that interacts with the multi-mode communication device. The first network and the second network can have independent synchronization procedures. This method allows a multi-mode communication device to efficiently scan for multiple networks, which can increase the battery life of the device.

Figure 1:
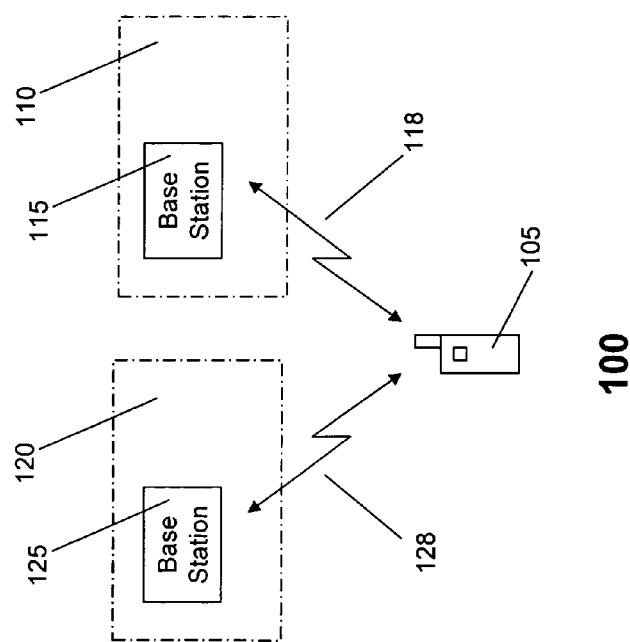
FIG. 1 illustrates an example of a first and second network and a multi-mode communication device that can communicate with the networks.

Referring to FIG. 1, a system 100 can include a first communication network 110 and a second communication network 120. The first network 110 can include one or more base stations 115 that can communicate with one or more communication devices 105 over a wireless channel 118. Similarly, the second network 120 can include one or more base stations 125 that can communicate with one or more communication devices 105 over a wireless channel 128. In one arrangement, the first network 110 can support a first communication protocol, and the second network 120 can support a second, different communication protocol. As such, the first network 110 and the second network 120 can have independent synchronization procedures.

The communication device 105 can be operable to communicate simultaneously with the first network 110 over the wireless channel 118 and the second network 120 over the wireless channel 128. The communication device 105 can be a multi-mode device, which can be defined as a device that is capable of communicating with two or more different networks, which may or may not operate according to different protocols. As such, the device 105 can operate according to a communication protocol supported by the first network 110 and a communication protocol supported by the second network 120. One of the networks 110, 120 may be a primary network, or a network that is currently actively serving the device 105. In this scenario, the other network 110, 120 may be referred to as a non-primary network.

As an example, the first network 110 can be a local area network (LAN) and the second network 120 can be a wide area network (WAN), though one skilled in the art will recognize that each of the networks 110 and 120 can be a WAN or a LAN, or any other suitable type of network. As an example, a WAN or a LAN as disclosed herein can support Global System for Mobile Communications (GSM), Code Division Multiple Access (CDMA), Worldwide Interoperability for Microwave Access (WiMAX), Long Term Evolution of GSM (LTE), 802.11, or any other suitable communication protocol. Furthermore, although the process described above is conducted over a network, those of skill in the art will appreciate that this idea could be implemented in a systemless, asynchronous communication environment.

Referring to FIG. 2, an example of the communication device 105 and a base station 115 are shown. In one arrangement, the communication device 105 can include a processor 150, a first transceiver 152, a second transceiver 153, a memory 154, and a user interface 158. As an option, each of the transceivers 152, 153 can include groups of components that are capable of at least simultaneously receiving communication signals from different networks that can support different protocols. As an example, the first transceiver 152 can scan for synchronization signals from the first network 110 and the second transceiver 153 can scan for synchronization signals from the second network 120, although one skilled in the art will appreciate that each transceiver 152, 153 can scan for either or both of the networks 110, 120.

The memory 154 may be a part of the processor 150 or may be a separate unit under the control of the processor 150. The user interface 158 and the transceivers 152, 153 can all be coupled to and under the control of the processor 150. As an example, the user interface 158 may include a display, a speaker, a keypad, or a vibration mechanism, although other suitable components may be part of the user interface 158. In an optional embodiment, the user interface 158 can be operable to give a visible, audible, or haptic indication to a user of the receiving unit 105 in response to a handover.

In another arrangement, the base station 115 may include a transceiver 162, a memory 164 and a processor 160, which may be coupled to both the transceiver 162 and the memory 164. As an option, the transceiver 162 can include groups of components that are capable of at least simultaneously receiving communication signals from different receiving units that can support different protocols. In addition, the memory 164 may be a part of the processor 160 or may be a separate unit under the control of the processor 160. It should be understood that this arrangement can be an example of the base station 115 of the first network 110 or the base station 125 of the second network 120. A description of the operation of these components will be presented below.

Figure 3:
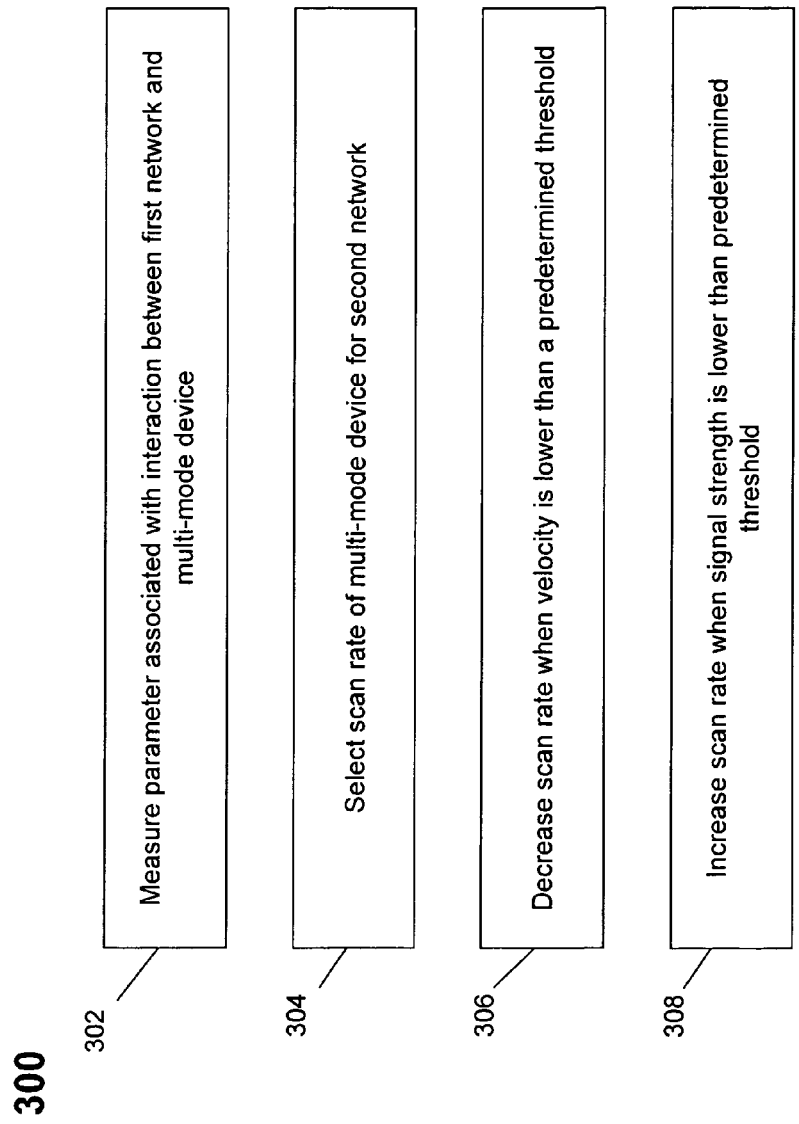
FIG. 3 illustrates an example of a method of selecting scanning rates at a multi-mode communication device.

Referring to FIG. 3, a method 300 of selecting scanning rates in a multi-mode communication device is shown. To describe this method 300, reference will be made to FIGS. 1 and 2, although it is understood that the method 300 can be practiced in any other suitable system using any other suitable components. Moreover, the steps of the method 300 are not limited to the particular order in which they are presented in the figure. Also, the method 300 can have a greater number of steps or a fewer number of steps than those shown in the figure.

At step 302, at a multi-mode communication device, at least one parameter associated with an interaction between a first network and the multi-mode communication device can be measured. At step 304, a scanning rate of the multi-mode communication device for a second, different network that interacts with the multi-mode communication device can be selected. There are at least two optional steps, although these are not necessarily the only ones available. As an example, in step 306, the scanning rate can be decreased when the velocity is lower than a predetermined threshold. As another example, in step 308, the scanning rate can be increased when the signal strength is lower than a predetermined threshold. In step 310, for a set of networks comprising at least one network, at least one parameter associated with an interaction between each network and the multi-mode communication device can be measured, and each member of the set of networks can be ranked.

For example, referring to FIGS. 1 and 2, at the multi-mode communication device 105, at least one parameter associated with an interaction between a first network 110 and the multi-mode communication device 105 can be measured. As an example, the parameter can be the type of network communicating with the device 105, which can be a Personal Area Network (PAN), Metropolitan Area Network (MAN), LAN, or WAN, or any other suitable network type as known in the art. As another example, the parameter can be the typical cell radius of the first network 110, which can be stored in the memory 154 before the measurement and retrieved by the processor 150 at the time of measurement. The cell radius can also be conveyed to the multi-mode communication device 105 over the wireless link 118 as a data field or can be measured in any other suitable manner known in the art.

The parameter can also be the signal strength at the multi-mode communication device 105 or at the first network 110. The signal strength can be expressed in terms of any suitable quantity known in the art, including, but not limited to, Carrier to Interference plus Noise Ratio (CINR), Signal to Interference plus Noise Ratio (SINR), or Received Signal Strength Indicator (RSSI). The signal strength can be measured at the multi-mode communication device 105 by execution of at least one operation in the processor 150 operating on at least one signal received from the first transceiver 152 or the second transceiver 153. Alternatively, the signal strength can be measured at the base station 115 by execution of at least one operation in the processor 160 operating on at least one signal received from the transceiver 162. It will be understood by one skilled in the art, however, that any suitable alternative technique for measuring signal strength can be used.

The parameter may also be the coverage status of the multi-mode communication device 105 with respect to the first network 110 in which the status can be categorized using any suitable categories. Suitable categories include available, marginal, or not available. In one embodiment, the coverage status can be measured at the multi-mode communication device 105 by execution of at least one operation in the processor 150 operating on at least one signal received from the first transceiver 152 or the second transceiver 153. As an example, the multi-mode communication device 105 can assign the coverage status of the first network 110 to be "available" if the measured signal strength is above a first predetermined threshold or can assign the coverage status of the network 110 to be "not available" if the measured signal strength is below the first or another predetermined threshold. A coverage status of "marginal" can be assigned if the measured signal strength is within a certain range of any of these predetermined thresholds. The above examples serve to illustrate, but not to limit, the techniques that can be used to measure a coverage status.

As an additional example, the parameter can be a time stamp of the last synchronization between the multi-mode communication device 105 with the first network 110 or the current scanning rate of the multi-mode communication device 105 with respect to the first network 110. In an alternative embodiment, the parameter can be the velocity of the multi-mode communication device 105 at the last signal strength measurement, which can be found through any suitable method known in the art, such as Doppler frequency based velocity estimation or Global Position System (GPS) based velocity estimation.

As another example, the parameter can be the minimum duration of scanning needed to detect the presence of the network 110, to synchronize to the network 110, or to receive signals from the network 110, including, but not limited to, paging signals. These durations can be stored in the memory 154 before the measurement and retrieved by the processor 150 at the time of measurement, can be conveyed to the multi-mode communication device 105 over the wireless link 118 as a data field or can be measured in any other suitable manner known in the art.

In another arrangement, the parameter can be a quality of service (QoS) support level of the first network 110 at the multi-mode communication device 105. A QoS support level of the network 110 can refer to a set of criteria that can describe a communication session between a network and a multi-mode communication device 105, including, but not limited to, a maximum supported data rate. This exemplary definition of QoS support level should serve not to limit, but to illustrate, the concept and it will be understood by one skilled in the art that suitable alternative definitions of "QoS support level" can be used.

At the multi-mode communication device 105, the QoS support level can be measured by decoding one or more bit fields transmitted over the wireless link 118 in which the bit fields can convey information such as the supported data rate or any other suitable criteria. The QoS support level of the network 110 can also be determined at the multi-mode communication device 105 by measuring characteristics of signals received from the network 110, such as, but not limited to, received data rate at the multi-mode communication device 105. The QoS support level can also be determined in any other suitable manner known in the art.

It will be understood that the above examples of parameters are not limiting in any way. Moreover, any suitable combination of parameters associated with the interaction between the multi-mode communication device 105 and the first network 110, including individual parameters, can be monitored for purposes of selecting a scanning rate.

As noted earlier, in view of the monitored parameters, a scanning rate of the multi-mode communication device for a network can be selected. Also, each network in the set of networks can be ranked, such as by using the QoS support level, signal strength, or any other suitable parameter as described above. In one example, as a result of the ranking, the scanning rate can be increased or decreased, or can remain the same. Alternatively, the network can be eliminated from the set of networks to be scanned.

An example process that can be used to select the scanning rate for a network and to rank a network will now be described. Any suitable method can be used, and the exemplary process given here is for illustrative purposes and should not be considered limiting in scope. In the process, the following thresholds can be used—

Acceptable_Primary_Network_Signal_Strength—this threshold can be a minimum signal strength needed in order for the multi-mode communication device 105 to operate on the primary network without monitoring other networks.

Maximum_Primary_Network_Velocity—this threshold can be a maximum allowed velocity of the multi-mode communication device 105 in order for the multi-mode communication device 105 to operate on the primary network without monitoring other networks Stationary_Threshold—this threshold can be a maximum velocity measurement for which the multi-mode communication device 105 is deemed stationary.

Handover_Monitor_Threshold—this threshold can be a minimum level of signal strength required in order for the multi-mode communication device 105 to monitor only the primary network. Below this threshold, it can be required that at least one secondary network be scanned. The scanning rates can be set to levels such as the following, although other levels or fewer levels can also be used—

Very Frequent Scanning—this rate can be a rate needed to detect a network handover candidate as soon as possible Very Infrequent Scanning—this rate can be a rate that is infrequent enough such that a predetermined level of battery life is obtained (conserved).

In this exemplary process, an initial scan of all supported networks can be performed, and each network can be ranked according to, for example, signal strength and QoS support level. Based on the above ranking, a primary network can then be designated (based on signal strength and QoS support level). It can then be determined if any non-primary networks are to be scanned.

For example, for each non-primary network, if the signal strength is less than the Handover_Monitor_Threshold or the velocity of the device 105 is greater than Maximum_Primary_Network_Velocity, the non-primary network should be scanned. The rate of scanning for each non-primary network that is to be scanned can also be determined. In particular, if the coverage status of the primary network is in the available or marginal categories and if the velocity of the device 105 is less than Stationary_Threshold, then the scanning rate for the non-primary network(s) can be decreased to a minimum required scanning rate, such as the Very Infrequent Scanning level. A minimum scanning rate can be any suitable rate that can help preserve battery life and can even include the cessation of scanning for a particular network. If, however, the velocity of the device 105 is greater than or equal to Stationary_Threshold, then the scanning rate can be increased according to the network cell radius and the velocity, for example.

Alternatively, if the coverage status of the primary network is in the not available category and the velocity of the device 105 is greater than or equal to Stationary_Threshold, then the scanning rate for the non-primary network(s) can be set to the Very Frequent Scanning level. In addition, if the velocity is below Stationary_Threshold or the velocity is unavailable, then the scanning rate for the non-primary network can be set to the Very Infrequent Scanning level. Of course, the above examples are not meant to be limiting in any way, as the scanning rates can be modified in accordance with any other suitable rules or scenarios.

The method 300 of FIG. 3 is described in which the parameters that are monitored are associated with the interaction between the primary network and the device. It must be noted that this description is not so limited. Specifically, the parameters of both the primary network and one or more non-primary networks can be monitored or measured for purposes of selecting a scanning rate of one or more non-primary networks. Once parameters for both primary and non-primary networks have been measured, the processes described above can be performed.

While the various embodiments of the present invention have been illustrated and described, it will be clear that the claimed subject matter is not so limited. Numerous modifications, changes, variations, substitutions and equivalents will occur to those skilled in the art without departing from the spirit and scope of the present invention as defined by the appended claims.

What is claimed is:

1. A method for selecting scanning rates in a multi-mode communication device, comprising:
   at the multi-mode communication device, measuring at least one parameter associated with an interaction between a first network and the multi-mode communication device, wherein the parameter includes a coverage status of the first network at the multi-mode communication device, a signal strength at the multi-mode communication device, a Quality of Service support level of the first network at the multi-mode communication device, or a velocity of the multi-mode communication device; and
   in response to measuring the parameter, selecting a scanning rate of the multi-mode communication device for a second, different network that interacts with the multi-mode communication device, wherein selecting the scanning rate of the second, different network comprises decreasing the scanning rate when the velocity is lower than a predetermined threshold, or increasing the scanning rate of the second, different network when the signal strength is lower than a second predetermined threshold;
   wherein the first network and the second, different network have independent synchronization procedures.

2. The method of claim 1, wherein the first network is a Local Area Network and the second network is a Wide Area Network.

3. The method of claim 1, further comprising ranking each member of a set of networks based on measuring at least one parameter associated with an interaction between each network and the multi-mode communication device, wherein the set of networks includes the first network and the second, different network.

4. The method of claim 3, wherein the parameters on which the ranking of each member is based include the Quality of Service support level of the network at the multi-mode communication device or the signal strength at the multi-mode communication device.

5. A method for selecting scanning rates in a multi-mode communication device, comprising:
   at the multi-mode communication device, measuring at least one parameter associated with an interaction between a first network and the multi-mode communication device;
   at the multi-mode communication device, measuring at least one parameter associated with an interaction between a second, different network and the multi-mode communication device,
   wherein the at least one parameter associated with the interaction between the first network and the multi-mode communication device or the at least one parameter associated with the interaction between the second, different network and the multi-mode communication device includes a coverage status of the first network or the second, different network at the multi-mode communication device, a signal strength at the multi-mode communication device, a Quality of Service support level of the first network or the second, different network at the multi-mode communication device, or a velocity of the multi-mode communication device; and
   in response to measuring the parameters, selecting a scanning rate of the multi-mode communication device for the second network,
   wherein selecting the scanning rate for the second network comprises decreasing the scanning rate when the velocity is lower than a predetermined threshold, or increasing the scanning rate when the signal strength at the multi-mode communication device is lower than a second predetermined threshold; and
   wherein the first network and the second, different network have independent synchronization procedures.

6. The method of claim 5, wherein the first network is a Local Area Network and the second, different network is a Wide Area Network.

7. The method of claim 5, further comprising ranking each member of a set of networks based on measuring at least one parameter associated with an interaction between each network and the multi-mode communication device, wherein the set of networks includes the first network and the second, different network.

8. The method of claim 7, wherein the parameters on which the ranking of each member is based include the Quality of Service support level of the network at the multi-mode communication device or the signal strength at the multi-mode communication device.

9. A multi-mode communication device, comprising:
  a first transceiver that interacts with a first network having a first synchronization procedure;
  a second transceiver that interacts with a second, different network having a second synchronization procedure that is independent of the synchronization procedure of the first network; and
  a processor that is coupled to the first transceiver and coupled to the second transceiver and operable to:
   scan for the first network;
   scan for the second, different network;
   measure at least one parameter associated with the first network, wherein the parameter includes a coverage status of the first network at the multi-mode communication device, a signal strength at the multi-mode communication device, a Quality of Service support level of the first network at the multi-mode communication device, or a velocity of the multi-mode communication device; and
   in response to the measuring the parameter, select a scanning rate of the second, different network, wherein selecting the scanning rate of the second, different network comprises decreasing the scanning rate when the velocity is lower than a predetermined threshold, or increasing the scanning rate when the signal strength is lower than a second predetermined threshold.

10. The multi-mode communication device of claim 9, wherein the first network is a Local Area Network and the second network is a Wide Area Network.

11. The multi-mode communication device of claim 9, wherein the processor is further operable to rank each member of a set of networks based on measuring at least one parameter associated with an interaction between each network and the multi-mode communication device, wherein the set of networks includes the first network and the second, different network.

12. The multi-mode communication device of claim 11, wherein the parameters on which the ranking of each member is based include the Quality of Service support level of the network at the multi-mode communication device or the signal strength at the multi-mode communication device.

* * * * *